United States Patent
Price et al.

(10) Patent No.: US 8,023,146 B2
(45) Date of Patent: Sep. 20, 2011

(54) PRINT CONTROL DEVICE, INFORMATION PROCESSING DEVICE, METHOD OF PRINT CONTROL DEVICE, METHOD OF INFORMATION PROCESSING DEVICE AND COMPUTER PROGRAM

(75) Inventors: Michael Andrew Price, Headington (GB); Richard Anthony Cudd, London (GB); Kenji Takahashi, London (GB)

(73) Assignee: Canon Kabushiki Kaisha, Tokyo (JP)

( * ) Notice: Subject to any disclaimer, the term of this patent is extended or adjusted under 35 U.S.C. 154(b) by 1126 days.

(21) Appl. No.: 11/793,471

(22) PCT Filed: Dec. 20, 2005

(86) PCT No.: PCT/GB2005/004940
§ 371 (c)(1),
(2), (4) Date: Jun. 20, 2007

(87) PCT Pub. No.: WO2006/067415
PCT Pub. Date: Jun. 29, 2006

(65) Prior Publication Data
US 2008/0205956 A1    Aug. 28, 2008

(30) Foreign Application Priority Data
Dec. 22, 2004 (GB) .................................. 0428087.1

(51) Int. Cl.
*G06F 15/00* (2006.01)
*G06F 15/16* (2006.01)
(52) U.S. Cl. ...................................... 358/1.18; 709/229

(58) Field of Classification Search ................ 358/1.18, 358/1.15, 1.14, 1.13, 1.9, 442, 401, 3.29; 455/556.1, 413, 406, 418; 382/229, 186, 382/154, 305; 235/404, 375, 380; 715/230, 715/231; 709/229, 221, 223, 224
See application file for complete search history.

(56) References Cited

U.S. PATENT DOCUMENTS
2002/0027673 A1    3/2002  Roosen et al.
2002/0057455 A1 *  5/2002  Gotoh et al. ................. 358/1.15

FOREIGN PATENT DOCUMENTS
EP          0854630 A2      7/1998
* cited by examiner

*Primary Examiner* — Saeid Ebrahimi Dehkordy
(74) *Attorney, Agent, or Firm* — Canon USA Inc. IP Division

(57) ABSTRACT

A print control device connects via a network to an information processing device that sends an instruction and data thereto. The print control device includes: a receiver for receiving from the information processing device editing information created by an editing application which edits data layout indicating printable data; and a controller for controlling the data layout based on editing information received by the receiver, wherein said data layout is displayed on an operation part of the print control device so that a user of the print control device selects one of the data to be printed by the print control device.

22 Claims, 7 Drawing Sheets

PRINT CONTROL DEVICE, INFORMATION PROCESSING DEVICE, METHOD OF PRINT CONTROL DEVICE, METHOD OF INFORMATION PROCESSING DEVICE AND COMPUTER PROGRAM

BACKGROUND OF THE INVENTION

1. Field of the Invention

The present invention relates to a print control device connectable via a network to an information processing device that sends an instruction and data thereto and the information processing device connectable via the network to the print control device that receives an instruction and data therefrom.

2. Description of the Related Art

A network administrator can access a file structure of the network using PC (personal computer) on the network and modify a data layout of the file structure by adding new files and deleting old files. And when a user wants to print desirable documents of a file stored in one of PCs on the network, a print instruction will be sent to MFP (Multi Function Peripheral) from the PC that the user is using now and the desirable document data will be sent to MFP from a memory of the PC storing it.

Recently it has been possible to upload configuration files to MFPs in order to change the user interface of the operation panel at runtime as disclosed in U.S. Patent application 20030011633. And also some modern MFPs have a mailbox function to store data from PCs on the network. The user can select at least one of data received by the MFP using an operation panel displaying the status of the mailbox function on the MFP and print it.

However, the user cannot provide a file structure on the operation panel that allows the printing of documents stored on the device's hard disk (HD). It is not possible to edit the data layout of the mailboxes to provide easy access to the relevant documents.

SUMMARY OF THE INVENTION

The present invention has been made in order to solve at least one of the problems described above. According to an aspect of the present invention, there is provided a print control device connectable via a network to an information processing device that sends an instruction and data thereto. The print control device includes: a receiver for receiving from the information processing device editing information created by an editing application which edits data layout indicating printable data; and a controller for controlling the data layout based on editing information received by the receiver, wherein said data layout is displayed on an operation part of the print control device so that a user of the print control device selects one of the data to be printed by the print control device.

According to another aspect of the present invention, there is provided an information processing device connectable via a network to a print control device that receives an instruction and data therefrom. The information processing device includes: an editor for making editing information by using an editing application which edits data layout indicating printable data; and a controller for sending the editing information to the print control device, wherein the data layout is displayed on an operation part of the print control device so that a user of the print control device selects one of the data to be printed by the print control device.

Other features and advantages of the present invention will be apparent from the following description taken in conjunction with the accompanying drawings, in which like reference characters designate the same or similar parts throughout thereof.

DETAILED DESCRIPTION OF THE EMBODIMENTS

A print control device, an information processing device, a method of the print control device, a method of the information processing device and programs thereof according to the present embodiment enable editing of a data layout indicating printable data and print processing for the data of the data layout.

Figure 1:
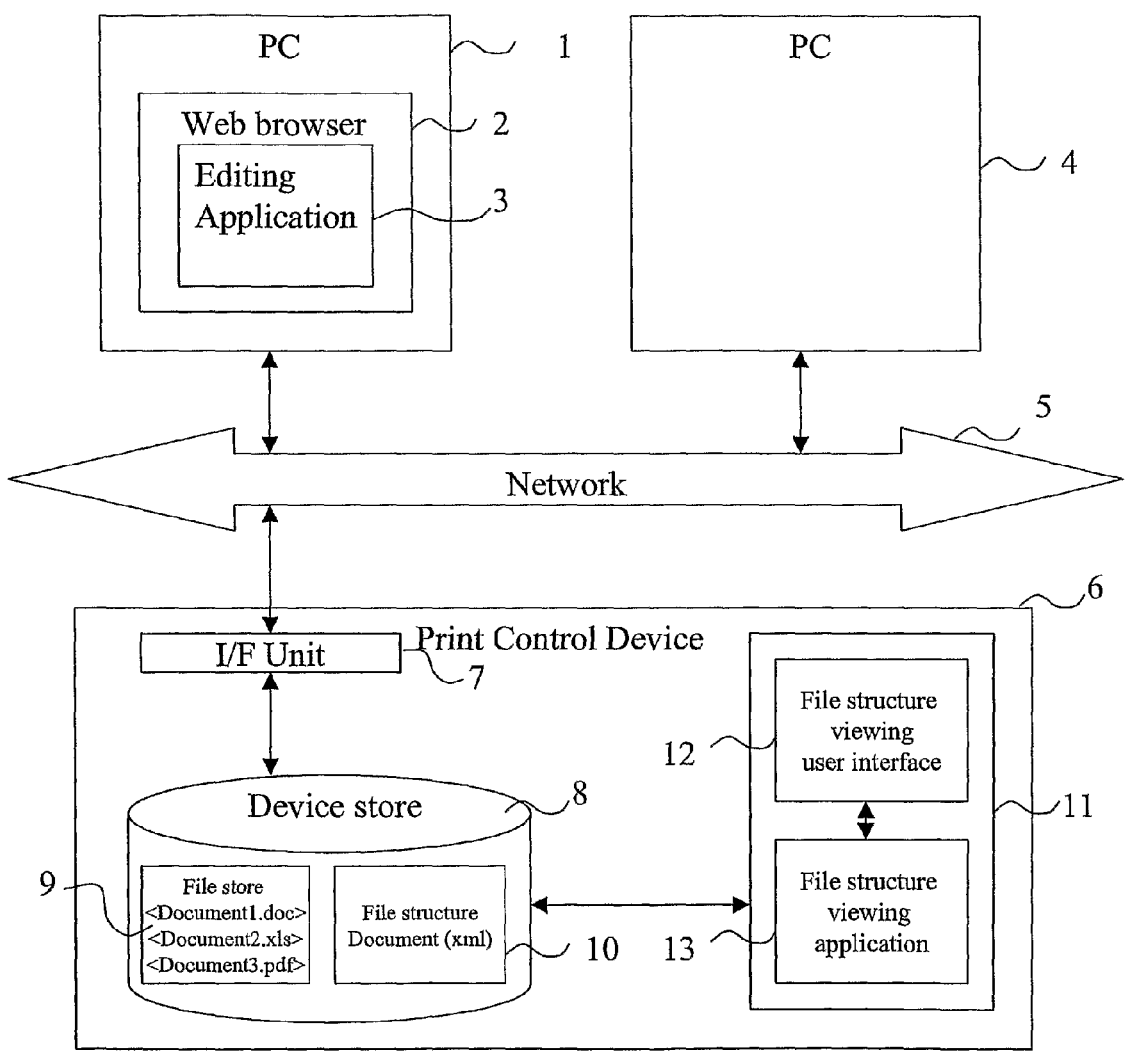
FIG. 1 illustrates relationship between the information processing devices (personal computers) and print control device (MFP) on the network according to an embodiment of the present invention.

In the following, a detailed description will be given of embodiments of the present invention with reference to the accompanied drawings. FIG. 1 illustrates relationship between the information processing devices (personal computers) and print control device (MFP) on the network according to an embodiment of the present invention. In FIG. 1, reference numeral 1 denotes a personal computer (information processing device) and includes at least a web browser 2 and editing application 3 to be downloaded (transferred) from device store 8 of print control device 6 (MFP) via I/F unit 7. Also, reference numeral 4 denotes another personal computer (information processing device) and includes at least the web browser 2 and editing application 3. The editing application 3 may also be provided into the PC 1 and 4 by reading it from external memory (HD, USB chip etc.). This editor can be used to add and delete documents (data) and/or folders into a data layout of the data structure that will be displayed on print control device 6.

Reference numeral 6 denotes print control device (MFP) and includes at least a file structure viewing user interface 12 and a file structure viewing application 13 stored in memory 11. Reference numeral 8 denotes device store (HD etc.) storing data 9 (document1.doc, document2.xls, document3.pdf and so on) and file structure document 10 (xml) The file structure document 10 (an editing information) can be uploaded (transferred) via the editing application from PC1 to the print control device 6. This upload occurs across the network 5. And then the file structure document 10 (xml) is received by I/F unit 7 in the print control device 6 and placed in the device store 8. By executing the file structure viewing application, the file structure document 10 is read from the device store 8. And then the file structure (data layout) is displayed based on the file structure document 10 via file structure viewing user interface on the print control device 6.

For example, in case that document3.pdf is added to the data structure using web browser 2, file structure document 10 (an editing information) is sent to print control device 6. After sending the file structure document 10 to print control device 6, document3.pdf is sent to print control device 6. If a user selects the document3.pdf using the file structure viewing user interface displayed on the print control device 6, print control device 6 can print document3.pdf immediately, because print control device 6 stores the document3.pdf in device store 8 in advance.

Figure 2:
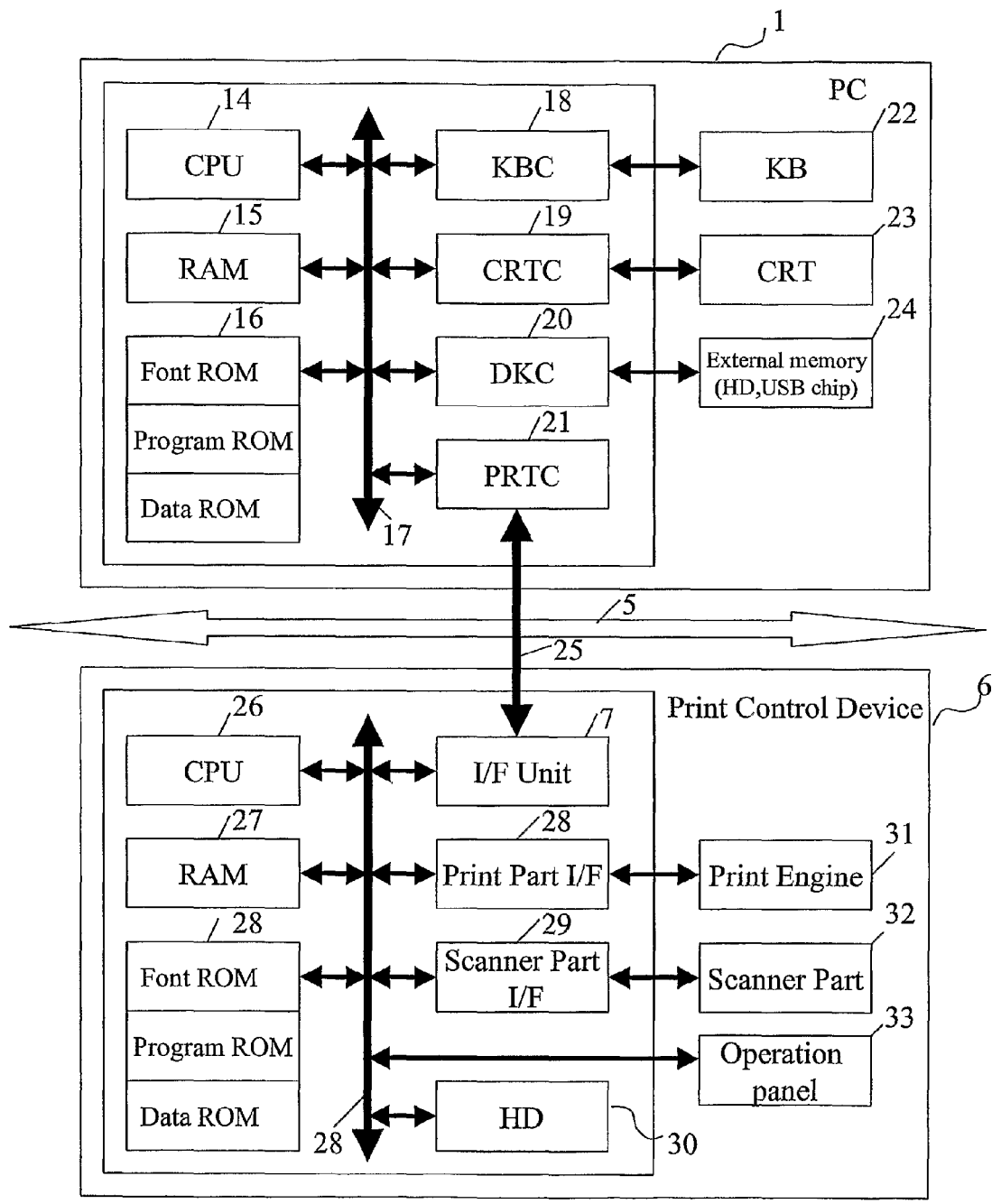
FIG. 2 is a block diagram illustrating a schematic configuration of a print controlling system including one of the information processing devices according to an embodiment of the present invention.

FIG. 2 is a block diagram illustrating a schematic configuration of a print controlling system including one of the information processing devices according to an embodiment of the present invention. In this regard, although a print controlling system is shown as an embodiment, the present invention is not limited to this. The present invention is applied to a network system in which processing is performed by connecting through a network such as a LAN (local area network), WAN (wide area network), etc., as long as it is an environment in which the editing application 3 can be executed.

Figure 3:
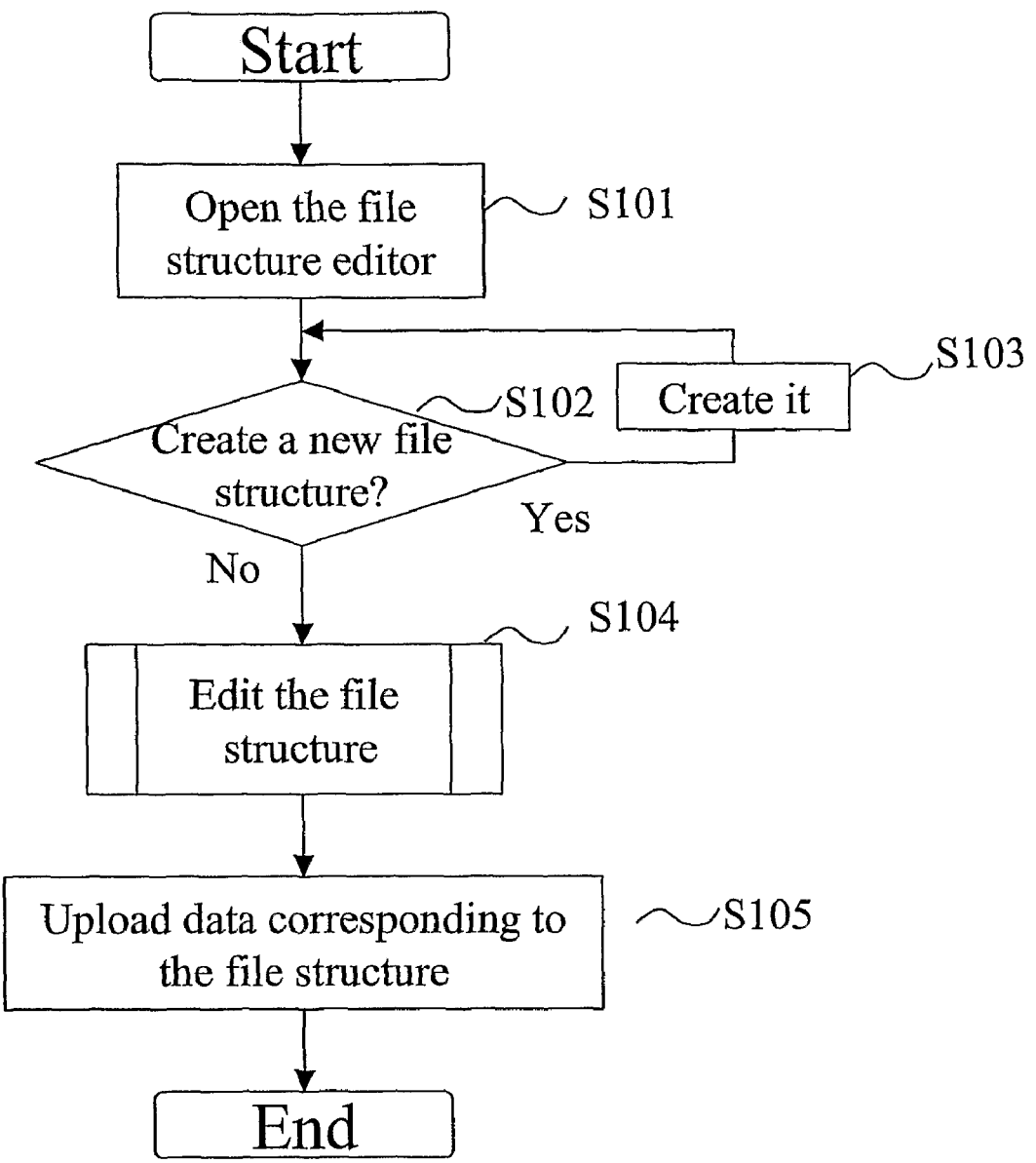
FIG. 3 is a flowchart illustrating an editing process to be executed in the information processing device.
Figure 4:
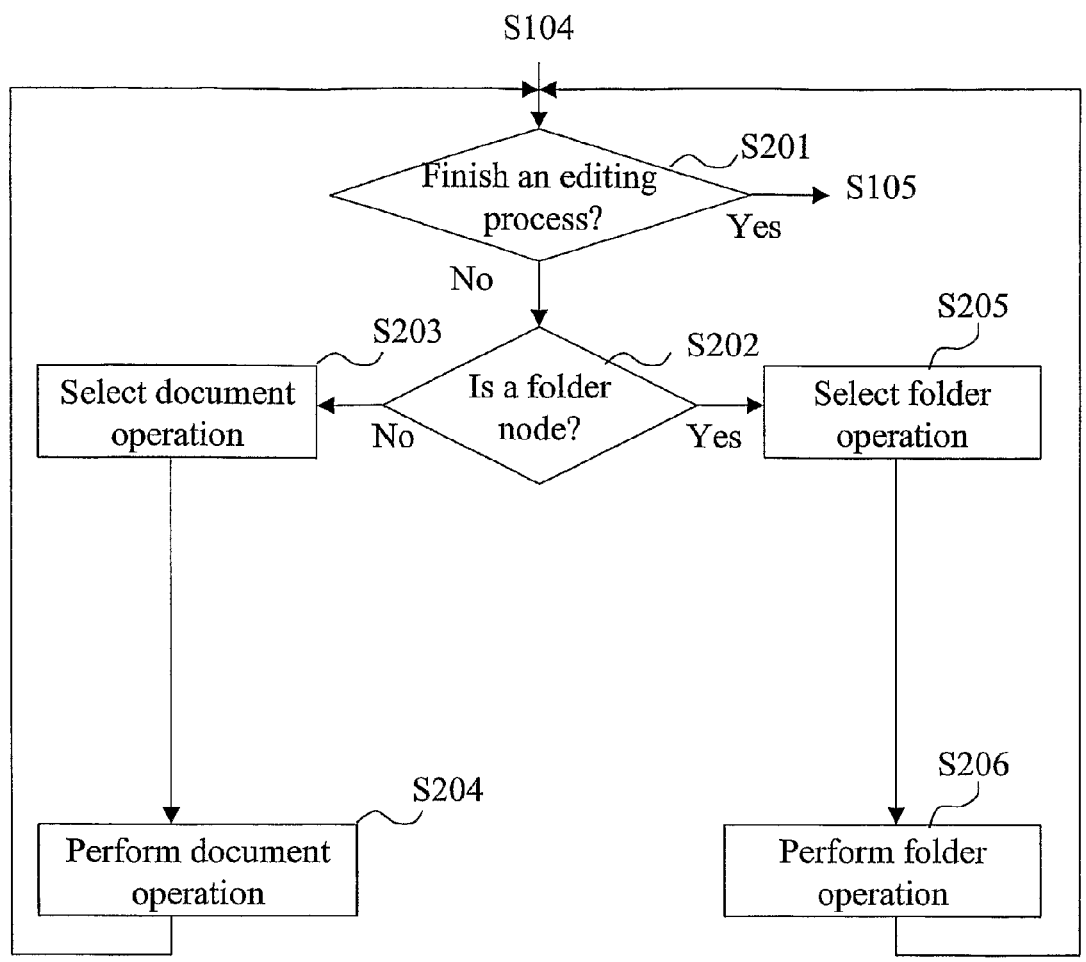
FIG. 4 is a flowchart illustrating a detailed process of the editing process shown in FIG. 3.

In FIG. 2, reference numeral 1 denotes one of personal computers (information processing devices) shown in FIG. 1, and includes a CPU (central processing unit) 14 which executes processing on documents including a combination of graphics, images, characters, tables (including spreadsheets), etc., based on a document processing program, etc., stored in a program ROM of a ROM (read only memory) 16 or an external memory 24 (HD, USB chip and so on). The CPU 14 integrally controls each of the devices connected to a system bus 17. Also, the program ROM of the ROM 16 or the external memory 24 stores an operating system (OS), which is the control program of the CPU 14, and web browser 2 (application), etc., a font ROM of the ROM 16 or the external memory 24 stores font data, etc., to be used for the document processing described above, and a data ROM of the ROM 16 or the external memory 24 stores various data to be used for the above-described document processing, etc. Reference numeral 15 denotes a RAM (random access memory), and functions as a main memory, a work area, etc., of the CPU 14. The editing application 3 shown in FIGS. 3 and 4 is downloaded from print control device 6 and stored in the working area of RAM 15 tentatively. And also the editing application 3 may be read from external device 24 and stored in the working area of RAM 15 tentatively. And then the editing application is stored in HD not shown in FIG. 2 or external memory 24.

Reference numeral 18 is a keyboard controller (KBC), and controls the input from a keyboard 22 and an unillustrated pointing device. Reference numeral 19 is a CRT controller (CRTC), and controls the display of a CRT (cathode ray tube) display 23. The user selects printable data (documents and/or folder) and control icons displayed on CRT 23 to edit a data layout of the file structure by using keyboard 22 or the pointing device. Reference numeral 20 is a disk controller (DKC), and controls the access to and from the external memory 24 such as a hard disk (HD), a USB memory chip, etc., which store a boot program, various applications including editing application 3, font data, user files, edit files, etc.

Figure 6:
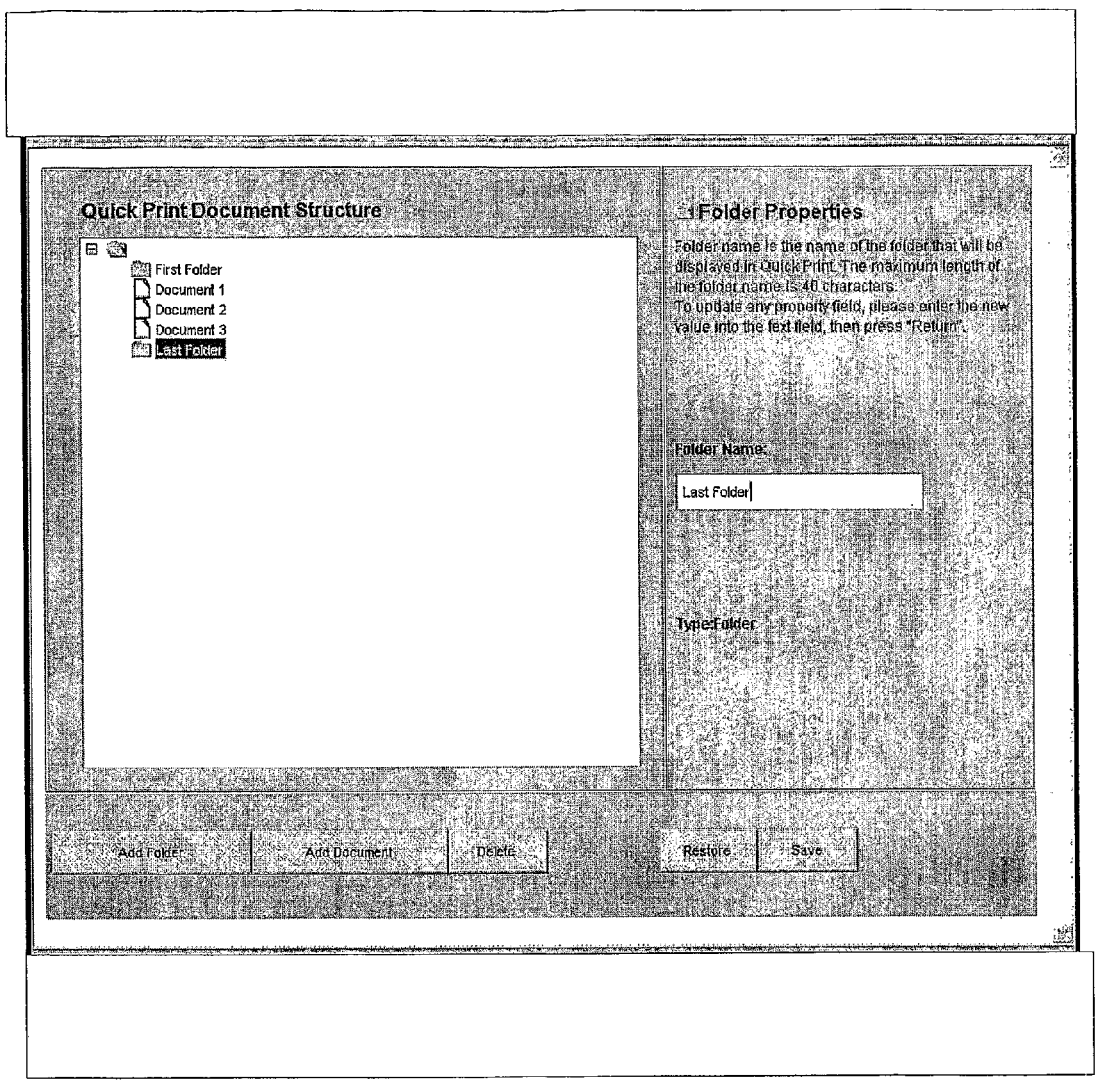
FIG. 6 is a diagram showing a data layout and control icons to be displayed on a display of the information processing device.

Reference numeral 21 is a print controller (PRTC), which is connected to a print control device 6 through a predetermined bi-directional interface (interface) 25 via the network 5, and executes communication control processing with print control device 6. In this regard, CPU 26 executes, for example, outline-font expansion (rasterization) processing into a display information RAM, which is set in RAM 27, and provides WYSIWYG (what you see is what you get) on CRT 23. Also, CPU 26 opens various registered windows, and executes various data processing based on the commands instructed by an unillustrated mouse cursor, etc., on CRT 23. When editing data layout of data structure, the user opens the windows shown in FIG. 6 on CRT 23, and the user can perform the editing process and a print process for print control device 6 described below. FIG. 6 is a diagram showing a data layout and control icons to be displayed on a display (CRT 23) of the information processing device (PC1).

In print control device 6, reference numeral 26 is a CPU. CPU 26 outputs an image signal as output information to a print part (printer engine) 31 connected to a system bus 28 based on the control program, etc., stored in a program ROM of a ROM 28 or the control program, etc., stored in HD 30. Also, the program ROM of the ROM 28 stores a control program, etc., of the CPU 26. A font ROM of the ROM 28 stores font data, etc., to be used when the above-described output information is created. A data ROM of the ROM 28 stores information, etc., to be used in the PC 1 when the print control device 6 does not have a hard disk (HD) 30, etc.

CPU 26 is capable of performing communication processing with the PC 1 through an I/F unit 7 shown in FIG. 1, and is capable of providing editing application 3, document data, file structure document 10 (editing information), etc., between PC 1 and print control device 6. Reference numeral 27 is a RAM which functions as a main memory, a work area, etc., of CPU 26, and the memory capacity thereof can be expanded by an optional RAM connected to an unillustrated expansion port. In this regard, the RAM 27 is used for an output information expansion area, environment data storage area, an NVRAM (Non-Volatile RAM), etc.

HD 30 stores font data, an emulation program, form data, editing application 3, documents files 9, file structure document 10, file structure viewing user interface 12, file structure viewing application 13, etc. Reference numeral 29 is a scanner part I/F and controls documents scanned by scanner part 32 (scanner engine). The scanned document may be printed by print engine 31 and sent to PC 1 or PC2 by using a telephone line in a facsimile mode of print control device 6. The scanned document is indicated in the data layout and is selected for the printing by the user. Also, reference numeral 33 is an operation panel (part), and icons for operation shown in FIG. 7, etc., are disposed thereon.

FIG. 3 is a flowchart illustrating an editing process (editing application 3) to be executed in PC 1 or 2 (information processing device). If a user input predetermined URL (IP address) into web browser 2 that PC 1 is running now, editing application 3 is downloaded from print control device 6 via network 5 and stored in the work area of RAM 15. And then CPU 14 executes program codes describing each step of the flow chart in FIGS. 3 and 4 as follows. If the user selects editing application 3 stored in external memory 24, CPU 14 executes the program codes describing each step of the flow chart in the same way. In step 101 of FIG. 3, CPU 14 opens a file structure editor shown in FIG. 6 and determines if the user instructs to create a new file structure on CRT 23 in step 102. If YES, CPU 14 creates the new file structure and changes a document structure (data layout) displayed on CRT 23 according to the creation in step 103. If NOT, CPU 14 edits the file structure based on an instruction of the user in step 104. If the user creates the new folder by clicking the icon of "Add Folder" and inputs a name of the folder in a blank box (folder name;) in FIG. 6, the new folder is displayed on left side in FIG. 6. As described below, editing information according to the change of the data layout of the data structure will be sent to print control device 6 from PC 1 and same data layout will be displayed on operation panel 33 of print control device 6.

FIG. 4 is a flowchart illustrating a detailed process of the editing process shown in FIG. 3. In step 201, CPU 14 determines if the user selects "Save" icon on CRT 23 to finish the editing process. If YES, CPU 14 executes program code of a step 105. If NO, CPU 14 determines in step 202 whether or not the currently selected node is a folder node. If YES in step 202, the user selects the folder operation in step 205 such as "Add Folder", "Delete" or "Add Document" in FIG. 6. In step 206, CPU 14 performs the selected operation. If the user selects "Add Folder", CPU 14 adds a new folder designated by the user into the data layout in FIG. 6. If the user selects "Delete", CPU 14 deletes the folder designated by the user from the data layout. If the user selects "Add Document", CPU 14 adds a new document designated by the user into the data layout in FIG. 6. If NO in step 202, CPU 14 determined that the user selected a document on CRT 23. And then CPU 14 selects a document operation in step 203 such as "Add Document" or "Delete" in FIG. 6. and in step 204 performs the document operation to add or delete the document designated by the user on CRT 23. If the user selects "Add Document", CPU 14 adds a new document designated by the user into the data layout in FIG. 6. If the user selects "Delete", CPU 14 deletes the document designated by the user from the data layout. Before CPU 14 executes step 202, the user has selected a folder or document for editing. A document name for the added document is displayed based on the name that has been given to the document. After step 204 and 206, CPU 14 repeats the execution of above-mentioned step 201.

In the step 105 of FIG. 3, CPU 14 uploads (transfers) editing information (file structure document 10) corresponding to the data layout (file structure) to print control device 6. If a folder or a document is added into the data layout, the data (documents in the folder or the document) will be sent to print control device 6 after sending the editing information. The data and the editing information may be sent to print control device 6 simultaneously. For example, in case that document 3 shown in FIG. 6 is added into current data layout displayed on CRT 23, editing information of the change of the data layout and data of document 3 is uploaded from PC 1 to print control device 6. And then CPU 14 ends the flow and document 3 is stored in HD 30 of print control device 6.

Figure 7:
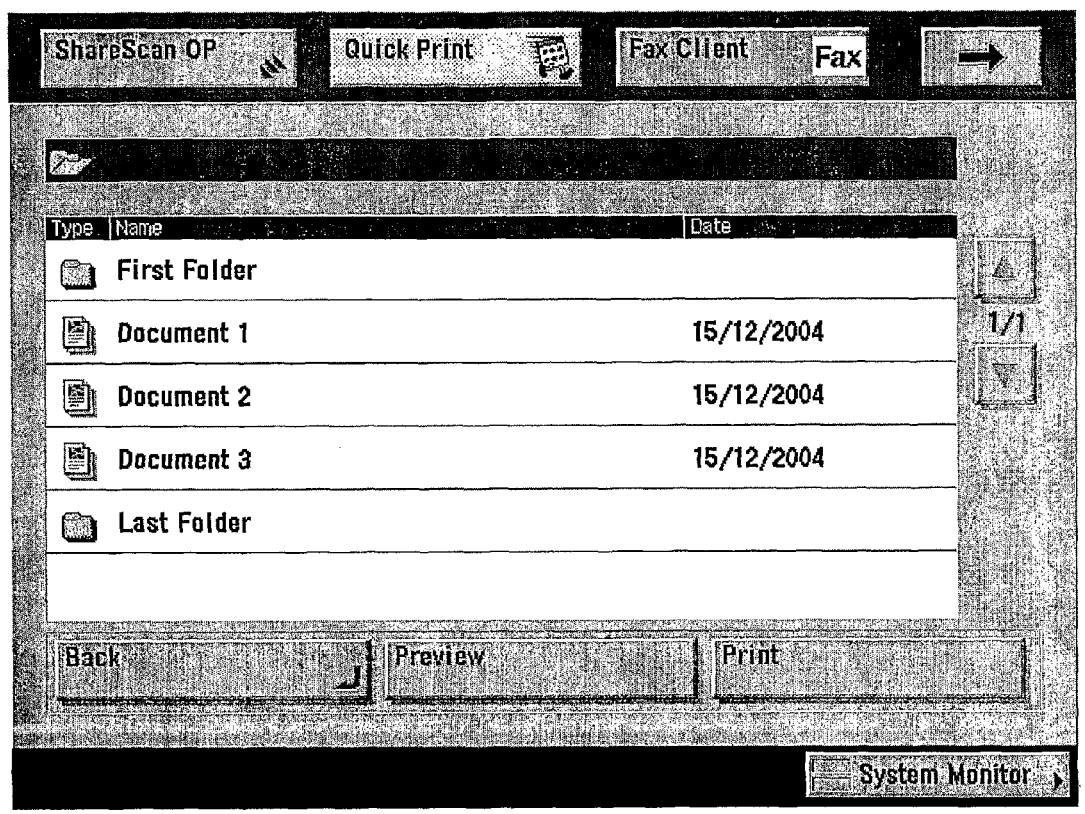
FIG. 7 is a diagram showing a data layout and control icons to be displayed on an operation part (panel) of the print control device.

As described below, document 3 will be displayed on operation panel 33 as the data layout in FIG. 7. If the user selects document 3 on operation panel, document 3 stored in HD 30 will be printed by print engine 31.

Figure 5:
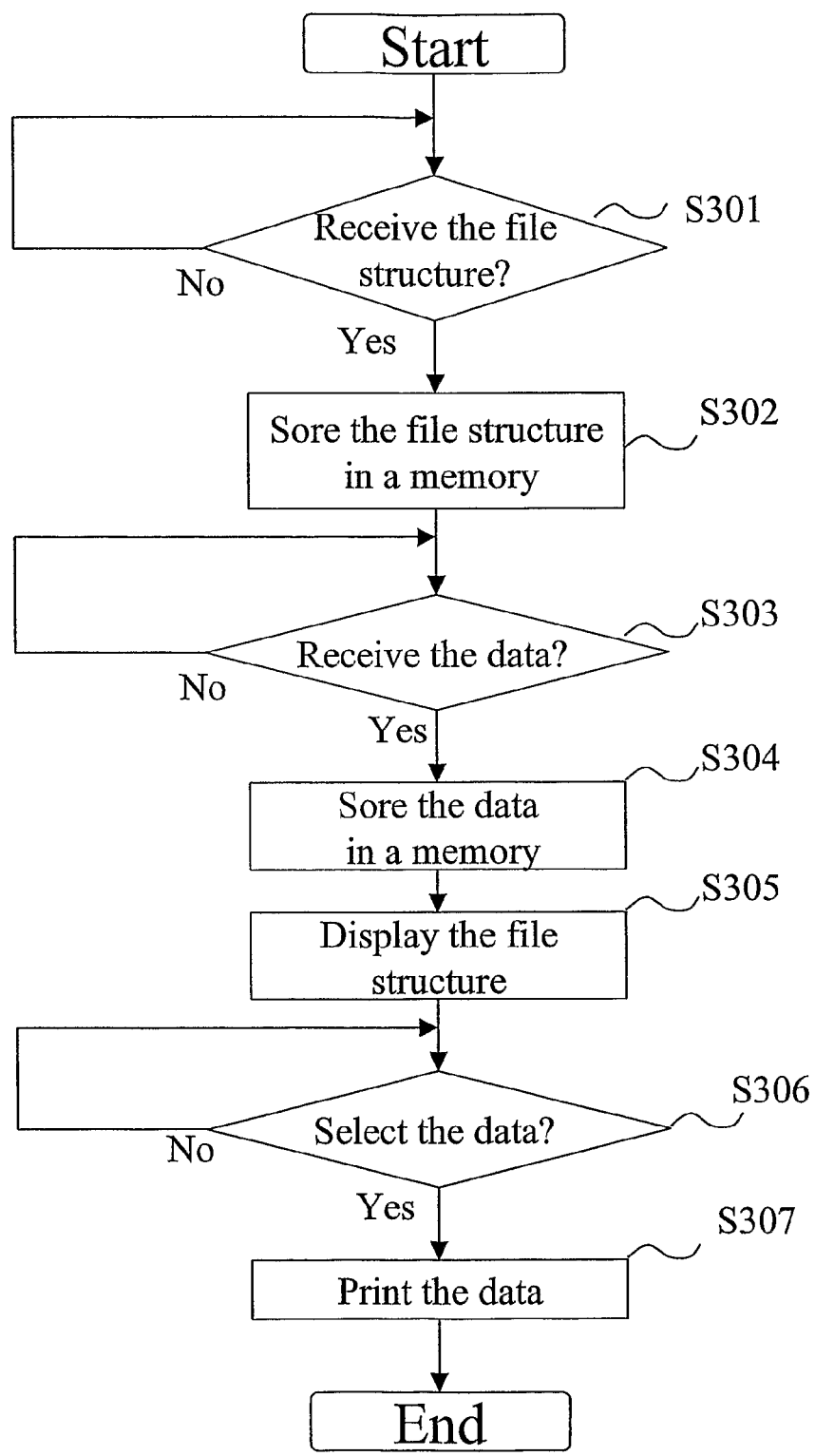
FIG. 5 is a flowchart illustrating a print control process to be executed in the print control device.

FIG. 5 is a flowchart illustrating a print control process (file structure viewing application 13 and printing application) to be executed in print control device 6. If the user turns on print control device 6, CPU 26 executes program codes describing each step of the flowchart shown in FIG. 5. In step 301, CPU 26 determines if I/F unit 7 receives file structure document 10 (the editing information) from PC 1, which is sent to print control device 6 in step 105 in FIG. 3. If NOT, CPU 26 repeats the step 301. If YES, CPU 26 stores it in RAM 27 or HD 30 in step 302. And then, in step 303, CPU 26 determines if I/F unit 7 receives the data (added documents) corresponding to the change of data layout (the file structure) from PC 1. If NOT, CPU 26 repeats step 303. If YES, CPU 26 stores the data in RAM 27 or HD 30 in step 304. For example, in case that document 3 is added into the data layout, data of document 3 is sent from PC 1 to print control device 6. In step 305, CPU 26 displays a window shown in FIG. 7 on operation panel 33. FIG. 7 is a diagram showing a data layout and control icons to be displayed on an operation part (a panel) of print control device 6. The data layout displayed on the operation panel 33 is identical with the data layout displayed on CRT 23 of PC 1. The data layout includes at least one document and/or folder having at least one document shown in FIGS. 6 and 7. And in step 306, CPU 26 determines if the user selects data of the data layout to print it. If NO, CPU 26 repeats step 306. If YES, in step 307 CPU26 prints the data by using print engine 31. For example, in case the user selects document 3 in the data layout displayed on operation panel 33, print control device 6 prints it by print engine 31. It is not necessary to send document 3 to print control device 6, since document 3 has already been sent to print control device 6 and stored in HD 30. If print control device 6 does not have enough memory space in HD 30 (device store 8), print control device 6 cannot store document3.pdf in HD 30. In this case, after the user selects document3.pdf on operation panel 33 for printing, print control device 6 requests PC1 to upload document3.pdf to print control device 6. After receiving document3.pdf, print control device 6 prints it by print engine 31. If PC 1 is turned off at this time, CPU 26 displays a message that PC 1 is not available on operation panel 33. Print control device 6 recognizes that PC 1 is turned off by communicating with a status unit of PC 1 that keeps a power line at any time.

Also, in the above-described embodiment, various functions are achieved by reading the programs for achieving the functions in PC 1 or print control device 6 into the memory (RAM) and the CPU executing these functions. However, the invention is not limited to this, and all of the processing or part of the functions may be achieved by dedicated hardware. Also, the above-described memory may be constituted by a non-volatile memory such as a magnetic optical disk unit, a flash memory, etc., a read-only recording medium such as a CD-ROM, etc., a volatile memory other than a RAM, or a computer-readable and writable recording medium by the combination of these.

Also, a program for achieving various processing functions in the PC 1 or print control device 6 may be recorded into a computer-readable recording medium, and the program recorded in the recording medium may be read into a computer system, and each processing may be performed by executing the program. In this regard, a "computer system" mentioned here includes an OS, hardware such as a peripheral device, etc.

Also, a "computer-readable recording medium" means a portable medium such as a flexible disk, a magnetic optical disk, a ROM, a CD-ROM, etc., and a storage device such as a hard disk contained in a computer system. Furthermore, a "computer-readable recording medium" includes a device for holding a program for a certain period of time such as an internal volatile memory (RAM) of a computer system to be a server or a client when the program is transmitted through a network such as the Internet, etc., and a communication line such as a telephone line, etc.

Also, the above-described program may be transmitted from a computer system storing the program in a storage device, etc., through a transmission medium, or may be transmitted to another computer system by a transmitted wave in the transmission medium. Here, a "transmission medium" for transmitting the program means a medium having an information transmission function such as a network (communication network), for example, the Internet, etc., and the communication line such as a telephone line, etc. Also, the above-described program may achieve part of the above-described functions. Furthermore, the program may achieve the above-described functions by combining with the program that is already recorded in a computer system, that is to say, the program may be a differential file (differential program).

Also, a program product such as a computer-readable recording medium which records the above-described program may be applied to an embodiment of the present invention. The above-described program, recording medium, a transmission medium, and the program product are included in the scope of the present invention. As described above, a detailed description has been given of the embodiments of the present invention with reference to the drawings. However, a specific structure is not limited to the embodiments, and a design, etc., are included within the spirit and scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print control device connectable via a network to an information processing device that sends an instruction and data thereto, the print control device comprising:
    a receiver for receiving from the information processing device editing information created by an editing application which edits data layout indicating a file structure of printable data; and
    a controller for controlling the data layout based on editing information received by the receiver, wherein said data layout is displayed on an operation part of the print control device so that a user of the print control device selects one of the data to be printed by the print control device,
    wherein the information processing device is configured to send any new printable data to the print control device in the case that the data layout is changed in the information processing device, and
    wherein the receiver is configured to receive the data from the information processing device after receiving the editing information.

2. The print control device according to claim 1, wherein the editing application is provided into the information processing device by reading it from a memory detachable from the information processing device.

3. The print control device according to claim 1, wherein the editing application is provided into the information processing device by downloading it from the print control device.

4. The print control device according to claim 1, wherein the displayed data layout is identical with a data layout to be displayed on a display of the information processing device.

5. The print control device according to claim 1, further comprising a printer engine to print the data selected by the user.

6. The print control device according to claim 1, wherein the receiver receives from the information processing device data to be printed, in the case that the user selects the data stored in the information processing device.

7. The print control device according to claim 1, wherein the controller displays a message that the information processing device is not available, in the case that the information processing device is turned off.

8. The print control device according to claim 1, wherein the data layout includes at least one document and/or folder having at least one document.

9. The print control device according to claim 1, wherein the data is a document scanned by the print control device.

10. An information processing device connectable via a network to a print control device that receives an instruction and data therefrom, the information processing device comprising:
    an editor for making editing information by using an editing application which edits data layout indicating a file structure of printable data; and
    a controller for sending the editing information to the print control device, wherein the data layout is displayed on an operation part of the print control device so that a user of the print control device selects one of the data to be printed by the print control device,
    wherein the controller is configured to send any new printable data to the print control device in the case that the data layout is changed in the information processing device, and
    wherein the controller is configured to send the data to the print control device after sending the editing information.

11. The information processing device according to claim 10, wherein the editing application is provided into the information processing device by reading it from a memory detachable from the information processing device.

12. The information processing device according to claim 10, wherein the editing application is provided into the information processing device by downloading it from the print control device.

13. The information processing device according to claim 10, wherein the displayed data layout is identical with a data layout to be displayed on a display of the print control device.

14. The information processing device according to claim 10, wherein the print control device has a printer engine to print the data selected by the user.

15. The information processing device according to claim 10, wherein the controller sends to the print control device data to be printed, in the case that the user selects the data stored in the information processing device.

16. The information processing device according to claim 10, wherein the print control device displays a message that the information processing device is not available, in the case that the information processing device is turned off.

17. The information processing device according to claim 10, wherein the data layout includes at least one document and/or folder having at least one document.

18. The information processing device according to claim 10, wherein the data is a document scanned by the print control device.

19. A method of a print control device connectable via a network to an information processing device that sends an instruction and data thereto, the method comprising:
    receiving from the information processing device editing information created by an editing application which edits data layout indicating a file structure of printable data; and
    controlling the data layout based on the received editing information, wherein said data layout is displayed on an operation part of the print control device so that a user of the print control device selects one of the data to be printed by the print control device,
    wherein the information processing device sends the data to the print control device in the case that the data layout is changed in the information processing device, and wherein the receiver receives the data from the information processing device after receiving the editing information.

20. A method of an information processing device connectable via a network to a print control device that receives an instruction and data therefrom, the method comprising:

making editing information by using an editing application which edits data layout indicating a file structure of printable data; and sending the editing information to the print control device, wherein the data layout is displayed on an operation part of the print control device so that a user of the print control device selects one of the data to be printed by the print control device, wherein the controller sends any new printable data to the print control device in the case that the data layout is changed in the information processing device, and wherein the controller sends the data to the print control device after sending the editing information.

21. A non-transitory computer-readable memory medium storing a computer program to be executed in a print control device connectable via a network to an information processing device that sends an instruction and data thereto, the program comprising:

instructions to receive from the information processing device editing information created by an editing application which edits data layout indicating a file structure of printable data; and instructions to control the data layout based on the received editing information, wherein said data layout is displayed on an operation part of the print control device so that a user of the print control device can select one of the data to be printed by the print control device, wherein the information processing device is configured to send any new printable data to the print control device in the case that the data layout is changed in the information processing device, and wherein the receiver is configured to receive the data from the information processing device after receiving the editing information.

22. A non-transitory computer readable memory medium storing a computer program to be executed in an information processing device connectable via a network to a print control device that receives an instruction and data therefrom, the program comprising:

instructions to make editing information by using an editing application which edits data layout indicating a file structure of printable data; and instructions to send the editing information to the print control device, wherein the data layout is displayed on an operation part of the print control device so that a user of the print control device selects one of the data to be printed by the print control device, wherein the controller is configured to send any new printable data to the print control device in the case that the data layout is changed in the information processing device, and wherein the controller is configured to send the data to the print control device after sending the editing information.

* * * * *

UNITED STATES PATENT AND TRADEMARK OFFICE
CERTIFICATE OF CORRECTION

| | | |
|---|---|---|
| PATENT NO. | : 8,023,146 B2 | Page 1 of 1 |
| APPLICATION NO. | : 11/793471 | |
| DATED | : September 20, 2011 | |
| INVENTOR(S) | : Michael Price et al. | |

It is certified that error appears in the above-identified patent and that said Letters Patent is hereby corrected as shown below:

On the Title Page
Item (73) Assignee should be:
CANON EUROPA NV
BOVENKERKERWEG 59-61
NL-1185 XB AMSTELVEEN, NETHERLANDS Signed and Sealed this
Twenty-first Day of February, 2012

David J. Kappos
*Director of the United States Patent and Trademark Office*